United States Patent Office 3,128,424
Patented Apr. 7, 1964

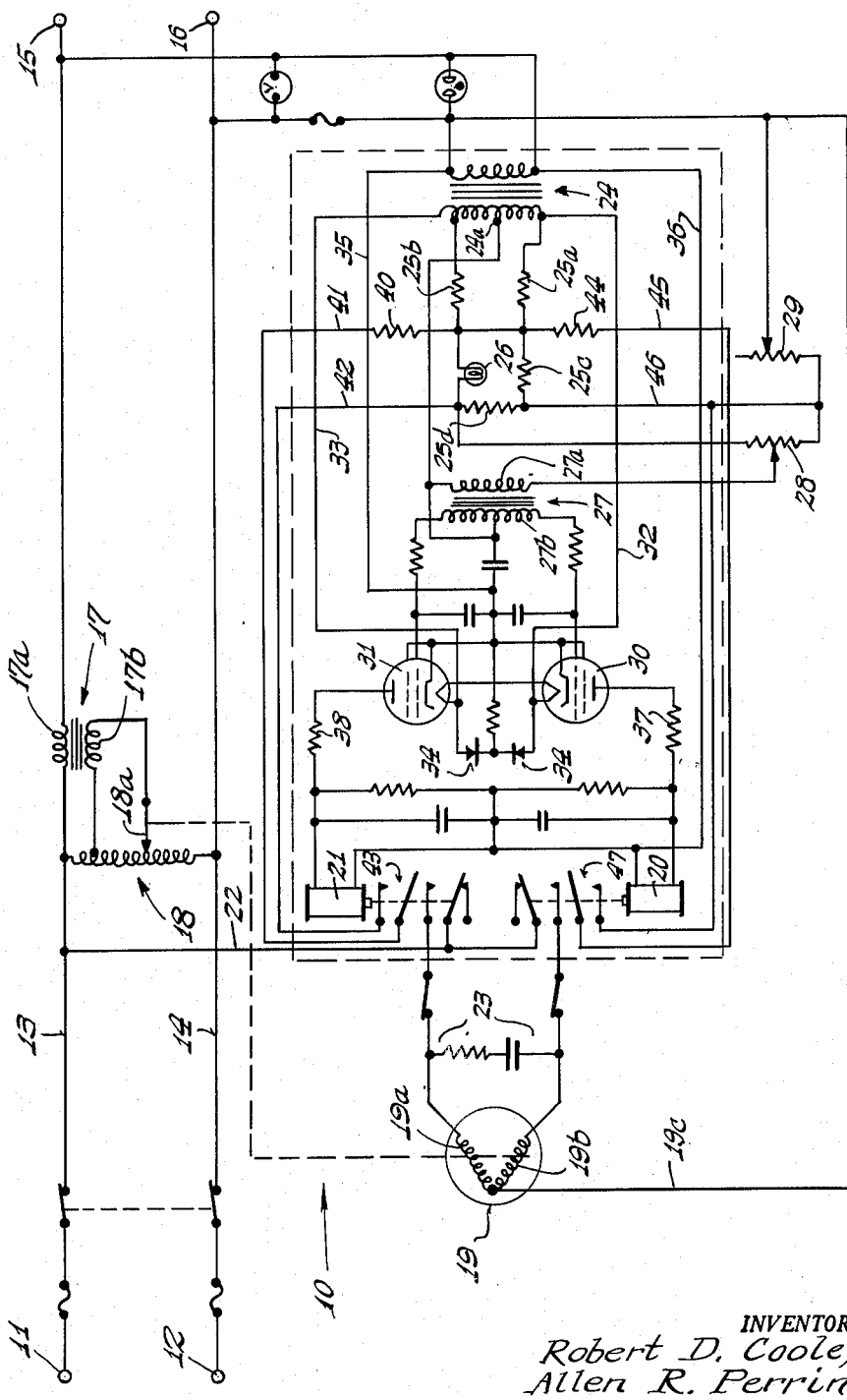

3,128,424
STABILIZED VOLTAGE REGULATOR
Robert D. Cooley, Litchfield, and Allen R. Perrins, Cheshire, Conn., assignors to The Superior Electric Company, Bristol, Conn., a corporation of Connecticut
Filed Aug. 4, 1959, Ser. No. 831,617
3 Claims. (Cl. 323—47)

The present invention relates to a regulator for automatically producing a substantially constant output voltage and more particularly to a regulator of the discontinuous control type.

One type of discontinuous control regulator employs a reversible electric motor that adjusts a variable impedance or, as in the hereinafter described embodiment of the invention, a variable transformer to regulate the output voltage. The energization of the motor to maintain constant the output voltage is determined by the deviation of the output voltage from a preselected value; however the output voltage may vary within a small range about the preselected value without the motor being energized to effect correction.

The size of the range determines the sensitivity of the regulator and attempts to increase the sensitivity by decreasing the size of the range have not been successful because of the substantial increase in the degree of "hunting" of the regulator as it attempts to find the correct position that produces an output voltage falling within a small range. Moreover while "hunting" may be somewhat decreased by decreasing the speed of the regulator in responding to correct a deviation in the output voltage, this is undesirable since ideally the speed of response should be instantaneous.

An object of the present invention is to provide an automatic voltage regulator having an increased sensitivity.

Another object of the instant invention is to provide in an automatic voltage regulator of the above type for substantially lessening the amount of "hunting" of the regulator even with an increase in sensitivity.

A further object of the present invention is to provide an automatic voltage regulator which accomplishes the above objects even with a faster speed of response than as heretofore been possible.

In achieving the above objects, the automatic voltage regulator of the present invention specifically includes an adjustable autotransformer to provide for the regulation of the output voltage. The autotransformer is driven by a reversible electric motor having one circuit which effects an increase in the output voltage and another circuit which effects a decrease in the output voltage. To detect deviation of the output voltage from a preselected value, there is provided a sensing circuit which produces a signal indicative of the direction and magnitude of the deviation and this signal is fed to a control circuit which energizes one or the other of the motor circuits. Since the control circuit functions merely as a switching circuit and energizes the motor whenever the signal from the sensing circuit is of a preselected magnitude, the motor is energized at full voltage and not proportionally to the value of the signal and remains so until the signal from the sensing circuit decreases below the preselected magnitude when it causes the control circuit to deenergize the motor. However, the inertia of the motor and also the finite response of the other parts of the circuit, particularly, the sensing circuit, since they do not function instantaneously, cause the motor to continue in motion and to overshoot the preselected value of the output voltage. This causes the sensing and control circuits to energize the motor in the reverse direction to bring the output voltage back to within the sensitivity range of the regulator.

To overcome this "hunting," and also to increase the sensitivity, the present invention provides for altering the balance or operating point of the sensing circuit whenever the motor is energized so that the sensing circuit is balanced and produces a non-actuating signal at a value of output voltage that is different than the selected output voltage. Thus when the regulator is correcting for an output voltage higher than the selected value, the sensing circuit produces a non-actuating signal to cease correcting when the output voltage is slightly higher than the desired value so that the inertia of the system causes the regulator to coast to the selected value of output voltage. When the regulator is correcting an output voltage lower than the selected value, the sensing circuit produces a non-actuating signal to cease correcting when the output voltage is slightly lower than the selected value.

In the specific embodiment hereinafter described the sensing circuit includes a bridge having opposite and adjacent sides with one side including a non-linear resistance (such as a tungsten filament lamp) element and its adjacent side at least one linear resistance. A resistance is connected paralleling each of these sides and in each parallel connection is a normally open switch. The switches are advantageously operated by the switches which control the energization of the motor and hence one switch is closed to place its resistance in parallel when the motor is energized to adjust the output voltage in one direction and the other switch is only closed to place the resistance in the circuit only when the motor is energized to adjust the output voltage in the other direction. The resistances have a value which decreases the total resistance of the side when they are connected thereto thereby varying the balance or non-actuating value of the output voltage at which the bridge is balanced or produces a non-actuating signal to the motor. Of course when the motor is not energized, the resistances are not in the circuit and the bridge is responsive to the selected value of output voltage.

Other features and advantages will hereinafter appear.

The only figure is an electrical schematic diagram of an automatic voltage regulator including the present invention.

Referring to the drawing, the regulator is generally indicated by the reference numeral 10 and has a pair of input terminals 11 and 12 and leads 13 and 14 connected thereto and to a pair of output terminals 15 and 16. Positioned in the lead 13 is a winding 17a of a transformer 17 while positioned across the leads 13 and 14 is a tapped adjustable autotransformer 18 whose output is connected to another winding 17b of the transformer 17. By this well-known arrangement, adjustment of the voltage from the autotransformer bucks and boosts the voltage across the leads 13 and 14 to produce an output voltage having a preselected value. It will be appreciated that, if desired, the output could be obtained directly from the output of the autotransformer since the invention is not to be considered as limited solely to the "buck-boost" regulator herein described.

Mechanically connected to the brush 18 of the autotransformer is a reversible electric motor 19 with the connection being schematically indicated by the dotted line. The motor 19 has two windings 19a and 19b and a common lead 19c connected to the lead 14. The windings 19a and 19b are associated with normally open relays 20 and 21 with relay 20 controlling in-phase energization of the winding 19b while relay 21 controls in-phase energization of the winding 19a. Current through the relays to the winding is supplied from the lead 22 connected to the lead 13. In this type of motor when one winding is energized by its associated relay with in-phase voltage, the other winding is energized with out-of-phase voltage through the phase changing circuit 23 even though its associated relay is open. The direction of rotation depends upon which winding is in-phase energized and thus closing of one relay with the other being open causes rotation of the motor in one direction while a reverse position of the relays causes rotation in the other direction.

In order to provide energization of either relay and hence the motor when the output voltage varies from the preselected value, the regulator includes a sensing circuit comprising a transformer 24 having a center tapped secondary 24a, resistances 25a, 25b, 25c and 25d and a tungsten lamp 26 forming a voltage sensing bridge with the output of the bridge being fed to a winding 27a of a transformer 27. In addition there is provided a pair of variable resistances 28 and 29. The elements are connected in the manner shown so that the primary of the transformer 24 is across the output terminals. The variable resistance 28 is employed to adjust the balance point of the bridge thereby enabling selection of the output voltage which is to be maintained substantially constant while the variable resistance 29 is used to increase the sensitivity of the control circuit. The output of the voltage sensing bridge is from the center tap of the winding 24a and the brush of the variable resistance 28.

The sensing bridge consists of a first pair of adjacent legs each being one half of the secondary winding 24a and a second pair of adjacent legs. The resistance 25b and the bulb 26 are in one leg while the other leg includes the resistances 25a and 25c. The resistance 25d and variable resistance 28 by being positioned between the two legs have portions in both depending on the setting of the variable resistance 28.

The sensing circuit produces a signal across the winding 27a which may be either in-phase or 180° out-of-phase with the output voltage depending upon the direction of deviation of the output voltage from the preselected value while the magnitude of the signal depends upon the amount of the deviation.

The signal in the winding 27a is fed to a control circuit for energizing the relays 20 and 21; this includes a pair of thyratron tubes 30 and 31 whose grids are connected to the secondary winding 27b of the transformer 27 to impress the signal thereon. A pair of leads 32 and 33 connected to the secondary winding of the transformer 24 supplies energization to the heaters of the thyratron tubes and through the rectifiers 34 produce a negative potential on the cathodes and the suppressor grids. A lead 35 is connected to one end of the primary winding of the transformer 24 and to the cathodes while a lead 36 is connected to the other end of the primary winding 24 and to the relays 20 and 21. The plate of the thyratron tube 30 is connected through a resistance 37 to the relay 20 and similarly the plate of the thyratron tube 31 is connected through a resistance 38 to the relay 21. It will thus be appreciated that upon conduction of either thyratron tube, energy flows through the lead 35 through the conducting thyratron, the relay associated with the thyratron and back to the lead 36 to energize and close the relay.

The thyratrons are normally biased in the circuit beyond cutoff so that they are non-conducting and a signal of a predetermined magnitude and phase is required on the grid to cause conduction in the tube as is well known in the art.

In the operation of the regulator should the voltage be lower than the preselected value, it is required that brush 18a move downwardly to add boosting voltage into the line 13 through the transformer 17. Movement of the brush is caused by in-phase energization of the winding 19a which requires that relay 21 be closed by being energized which occurs when the thyratron 31 is conducting. This is accomplished by the sensing circuit on which the output voltage is impressed producing a signal which has a magnitude and direction that, when impressed on the grid on the thyratron tube 31, causes it to fire.

Conversely if the signal from the sensing circuit is of the other phase and of the predetermined magnitude caused by the output voltage being higher than the preselected value, the tube 30 becomes conducting by reason of the signal being impressed on its grid which causes the relay 20 to be energized, effecting movement of the brush 18a upwardly by reason of the motor 19 being energized in the reverse direction.

The magnitude of the signal from the sensing bridge is proportional to the deviation of the output voltage from the preselected value and the thyratrons are biased sufficiently beyond cutout so that the signal has to have a predetermined magnitude in either direction before it renders the tubes conducting. Thus there is a range of output voltages between the exact preselected value of output voltage and a value above and below this preselected value in which the signal from the sensing circuit is insufficient to cause conductance of the tubes. This may be referred to as the sensitivity range of the regulator.

In operation, whenever the output voltage is outside the sensitivity range, the motor 19 is energized and as soon as the output voltage is within the sensitivity range the motor becomes deenergized. It will be appreciated, however, that while the sensitivity range should be as small as possible, the motor is either fully energized or deenergized and thus the motor to correct even a small change in output voltage will exhibit its full inertial torque. Also the other components of the regulator do not function instantaneously and the delay between the stopping of the motor and the output voltage produced thereat may cause overcorrection of the output voltage so that it may be on the other side of the sensitivity range which necessitates reenergization of the motor in the opposite direction.

According to the present invention, however, a signal is impressed on the thyratron tubes that has a magnitude which renders the thyratron tube non-conducting when the output voltage approaches but is not quite within the sensitivity range thereby compensating for the inertia of the motor and the delay in the other components. This synthesized condition is formed by adjusting the relative resistance values in the legs of the bridge circuit to produce a signal that renders the thyratrons non-conducting as the output voltage approaches the range of its preselected value.

To this end, there is provided a resistance 40 connected to be in parallel with the lamp 26 by leads 41 and 42 when a normally open switch 43 is operated to the closed position by the relay 21. Also there is provided a resistance 44 connected to be in parallel with the resistance 25c by leads 45 and 46 when a normally open switch 47 is operated to the closed position by the relay 20.

In operation, when the output voltage is lower than the preselected value of an amount sufficient to cause the thyratron tube 31 to be conducting, the relay 21 becomes energized closing its switches to place the resistance 40 in parallel with the lamp and to cause the motor to be energized to move the brush 18a upwardly to add boosting voltage into the transformer 17 to increase the output voltage. The value of the resistance 40 is such as to make the relative values of resistances between the adjacent legs of the bridge be in balance and produce a signal which is insufficient to render the thyratron non-conducting at a voltage which is slightly lower than the preselected value of output voltage so that when the output voltage attains this value, the thyratron 31 is rendered non-conducting, opening the relay 21 and the regulator by its own inertia continues to increase the output voltage to the preselected value. The bridge upon deenergization of the relay 21 is thus balanced only at the preselected value.

In a similar manner, when the output voltage is higher than the preselected value, the thyratron 30 is rendered conducting, closing the relay 20 to place the resistance 44 in the leg of the bridge and to energize the motor to add "bucking" voltage. The resistance 44 alters the balance point of the bridge so that it balances at an output voltage slightly higher than the preselected value to render the thyratron 30 non-conducting and deenergize the relay 20 when the output voltage is slightly higher than the preselected value.

The difference between output voltage when the bridge is balanced without either of the resistances 40 or 44 and with them is relatively small on the order of 1 volt when the preselected output voltage is 115 volts with a sensitivity of ±0.1 volt. It has been found that without the resistances 40 and 44, that the sensitivity range is approximately ±0.75 volt.

While there has been disclosed a thyratron operated control circuit, it will be appreciated that other relay actuating circuits may be employed, such as a transistorized circuit. Also while the sensing bridging is A.C. energized to produce an in-phase and out-of-phase signal it is well within the scope of the invention to provide a D.C. energized bridge as is well known in the art and to oppose the D.C. signal therefrom.

It will accordingly be appreciated that there has been disclosed an automatic voltage regulator in which the present invention is incorporated that enables an increase in the sensitivity of the regulator even with an increased speed of response of the regulator. In addition while the sensitivity and speed of response are increased, the "hunting" is decreased since the inertia of the system is compensated for my changing the value of output voltage at which the motor is energized only when it is energized to thereby cause deenergization of the motor at other than the preselected value of output voltage.

Variations and modifications may be made within the scope of the claims and portions of the improvements may be used without others.

We claim:

1. An automatic voltage regulator comprising input terminals, output terminals, means connected between the terminals for regulating the output voltage by adding to or subtracting from the input voltage, sensing means including a bridge having a pair of adjacent legs which have resistances connected to the output terminals for sensing the deviation of the output voltage from a preselected value and producing a signal indicative of the direction and magnitude of the deviation, control means connected to receive the signal from the sensing means and to control the regulating means and means for altering the value of the output voltage from which the sensing means senses the deviation of the output voltage by altering the relative value between the resistances in the pair of adjacent legs upon the regulating means adding to or subtracting from the input voltage.

2. An automatic voltage regulator comprising input terminals, output terminals, means connected between the terminals for regulating the output voltage by adding to or subtracting from the input voltage and including an electric motor having one circuit which when energized causes the output voltage to be increased and a second circuit which when energized causes the output voltage to be decreased, sensing means including a bridge having a pair of adjacent legs which have resistances connected to the output terminals for sensing the deviation of the output voltage from a preselected value and producing a signal indicative of the direction and magnitude of the deviation, control means connected to receive the signal from the sensing means and to control the regulating means and energize one or the other of the two motor circuits and means including a first and a second resistance for altering the value of the output voltage from which the sensing means senses the deviation of the output voltage upon the regulating means adding to or subtracting from the input voltage by inserting the first resistance in parallel with one leg only when one of the motor circuits is energized and for inserting the second resistance in parallel with the other leg only when the other of the motor circuits is energized.

3. The invention as defined in claim 2 in which each motor circuit includes a relay having a pair of normally open switches, one of said switches being connected between a source of energy and the motor, and the other switch being in series with one of the resistances and its connection to the leg.

References Cited in the file of this patent
UNITED STATES PATENTS

| | | |
|---|---|---|
| 2,022,537 | Champlin | Nov. 26, 1935 |
| 2,453,451 | Moseley | Nov. 9, 1948 |
| 2,504,017 | George et al. | Apr. 11, 1950 |
| 2,601,060 | Runaldue | June 17, 1952 |
| 2,725,522 | Murray et al. | Nov. 29, 1955 |